United States Patent
Gibson

(10) Patent No.: US 6,490,359 B1
(45) Date of Patent: Dec. 3, 2002

(54) METHOD AND APPARATUS FOR USING VISUAL IMAGES TO MIX SOUND

(76) Inventor: David A. Gibson, 530 Palo Alto Ave., Palo Alto, CA (US) 94301

( * ) Notice: Subject to any disclaimer, the term of this patent is extended or adjusted under 35 U.S.C. 154(b) by 0 days.

(21) Appl. No.: 09/099,482

(22) Filed: Jun. 17, 1998

Related U.S. Application Data

(63) Continuation-in-part of application No. 08/423,685, filed on Apr. 18, 1995, now Pat. No. 5,812,688, which is a continuation-in-part of application No. 08/118,405, filed on Sep. 7, 1993, now abandoned, which is a continuation-in-part of application No. 07/874,599, filed on Apr. 27, 1992, now abandoned.

(51) Int. Cl.⁷ ............................. H04B 1/00; H03G 3/00; G10H 7/00
(52) U.S. Cl. ............................. 381/119; 381/61; 84/600
(58) Field of Search ....................... 381/119, 61; 84/600

(56) References Cited

U.S. PATENT DOCUMENTS

| | | | |
|---|---|---|---|
| 4,176,252 A | * 11/1979 | Dutkovich | 381/107 |
| 4,609,917 A | * 9/1986 | Shen | 345/421 |
| 4,792,974 A | 12/1988 | Chase | 381/1 |
| 4,899,115 A | * 2/1990 | Christian | 330/302 |
| 4,993,073 A | 2/1991 | Sparkes | 381/119 |
| 5,027,689 A | 7/1991 | Fijimori | 84/622 |
| 5,048,390 A | 9/1991 | Adachi et al. | 84/464 R |
| 5,153,829 A | 10/1992 | Furuya et al. | 364/419 |
| 5,212,733 A | 5/1993 | De Vitt et al. | 381/119 |
| 5,283,867 A | 2/1994 | Bayley et al. | 395/119 |
| 5,286,908 A | 2/1994 | Jungleib | 81/603 |
| 5,524,060 A | * 6/1996 | Silfvast et al. | 381/119 |
| 5,636,283 A | * 6/1997 | Hill et al. | 381/17 |
| 5,818,418 A | * 10/1998 | Fujishita et al. | 84/600 |
| 6,061,458 A | * 5/2000 | East et al. | 381/119 |
| 6,111,960 A | * 8/2000 | Aarts et al. | 381/61 |

FOREIGN PATENT DOCUMENTS

EP 0357402 3/1990

* cited by examiner

Primary Examiner—Forester W. Isen
Assistant Examiner—Laura A. Grier
(74) Attorney, Agent, or Firm—Dergosits & Noah LLP; Richard A. Nebb

(57) ABSTRACT

A method and apparatus for mixing audio signals. Each audio signal is digitized and then transformed into a predefined visual image, which is displayed in a three-dimensional space. Audio effects added to the audio signals are transformed into predefined visual effects images, which are also displayed in a three-dimensional space. Selected audio characteristics of the audio signal, such as frequency, amplitude, time and spatial placement, are correlated to selected visual characteristics of the visual image, such as size, location, texture, density and color. Dynamic changes or adjustment to any one of these parameters, or parameters of the audio effect images, causes a corresponding change in the correlated parameter or audio effect.

13 Claims, 16 Drawing Sheets

LIMITS OF STEREO IMAGING

"V" Mix

"Inverted V" Mix

"Wavy Line" Mix

Scattered Placement Mix

Fattening

Reverb

Simple Structure

Even Volume Relationships

Symmetrical Mix

Threshold of a
Compressor/Limiter

Threshold of a
Noise Gate

Delay time with
Regeneration

Long Delay
panned separately

METHOD AND APPARATUS FOR USING VISUAL IMAGES TO MIX SOUND

This application is a continuation-in-part of Ser. No. 08\423,685, filed on Apr. 18, 1995 now U.S. Pat. No. 5,812,688; which in turn was a continuation-in-part of Ser. No. 08/118,405, filed on Sep. 7, 1993, now abandoned, which in turn was a continuation-in-part of Ser. No. 07/874,599, filed on Apr. 27, 1992, now abandoned.

BACKGROUND

The present invention relates generally to the art of mixing audio source signals to create a final sound product, and more specifically, to a method and apparatus for utilizing visual images of sounds to control and mix the source signals, including any sound effects added thereto, to achieve a desired sound product.

The art of mixing audio source signals is well known and generally referred to as recording engineering. In the recording engineering process, a plurality of source audio signals are input to a multi-channel mixing board (one source signal per channel). The source signals may be analog or digital in nature, such as microphone signals capturing a live performance, or a prerecorded media such as a magnetic tape deck, or a MIDI device (musical instrument digital interface) such as a synthesizer or drum machine. The mixing board permits individual control of gain, effects, pan, and equalization for each channel such that the recording engineer can modify individual channels to achieve the desired total sound effect. For example, it is possible for an individual person to record the performance of a song by recording the playing of different instruments at different times on different channels, then mixing the channels together to produce a stereophonic master recording representative of a group performance of the song. As should be obvious, the sound quality, including volume output, timbral quality, etc., of each channel can vary greatly. Thus, the purpose of the mix is to combine the different instruments, as recorded on different channels, to achieve a total sound effect as determined by the recording engineer.

The recording industry has evolved into the digital world wherein mixing boards and recorders manipulate and store sound digitally. A typical automated mixing board creates digital information that indicates mixing board settings for each channel. Thus, these mixer board settings can be stored digitally for later use to automatically set the mixer board. With the advent of MIDI control, cheaper computer controlled mixing boards have begun to appear. Such systems often include software which shows a picture of a mixing board on the computer screen, and the recording engineer often uses a mouse to manipulate the images of conventional mixing board controls on the screen. The computer then tells the mixer to make the corresponding changes in the actual mixing board.

There are also digital multitrack recorders that record digital signals on tape or hard disk. Such systems are also controlled by using a mouse to manipulate simulated recorder controls on a computer screen.

A new generation of controllers are being developed to replace the mouse for interacting with computers. For example, with a data glove or a virtual reality system one can enter the computer screen environment and make changes with their hands. Further, visual displays are becoming increasingly sophisticated such that one gets the illusion of three-dimensional images on the display. In certain devices, the visual illusion is so good that it could be confused with reality.

Computer processors have just recently achieved sufficient processing speeds to enable a large number of audio signals from a multitrack tape player to be converted into visual information in real time. For example, the Video Phone by Sony includes a Digital Signal Processor (DSP) chip that makes the translation from audio to video fast enough for real time display on a computer monitor.

The concept of using visual images to represent music is not new. Walt Disney Studios might have been the first to do so with its innovative motion picture "Fantasia." Likewise, Music Television (MTV) has ushered in an era of music videos that often include abstract visual imaging which is synchronized with the music. However, no one has yet come up with a system for representing the intuitive spatial characteristics of all types of sound with visuals and using those spatial characteristics as a control device for the mix. The multi-level complexities of sound recording are such that very little has even been written about how we visualize sound between a pair of speakers.

SUMMARY OF THE INVENTION

The present invention provides a method and apparatus for mixing audio signals having a plurality of audio characteristics associated therewith. According to the invention, a system for mixing a plurality of audio signals includes an audio mixer having a plurality of channels each of which for receiving one of a plurality of audio signals, and for varying audio characteristics of the received audio signal, and for outputting the varied audio signal. An effects processing unit associated with each of the channels adds audio effects to the audio signals. A microcomputer system includes a signal processing unit for transforming each audio signal into an audio signal visual image for display on a video display monitor. Each of the audio signal visual images has visual characteristics that correspond to the audio characteristics of the corresponding audio signal. The signal processing unit also generates audio effect images for display on the video display monitor. The audio effect images have visual characteristics that correspond to audio effects added to the audio signals by the effects processing unit. A user control allows a user to adjust the displayed audio effect images. The effects processing unit changes audio effects added to the audio signals in response to corresponding user adjustments to the displayed audio effect images.

In another aspect of the present invention, a system for mixing a plurality of audio signals includes an audio mixer having a plurality of channels each of which for receiving one of a plurality of audio signals, and for varying audio characteristics of the received audio signal, and for outputting the varied audio signal. A plurality of speakers broadcast the audio signals outputed by the audio mixer. A microcomputer system includes a signal processing unit for transforming each audio signal into an audio signal visual image for display on a video display monitor. Each of the audio signal visual images has visual characteristics that correspond to the audio characteristics of the corresponding audio signal. The audio signal visual images are displayed on the video display monitor within a three dimensional room background image that contains a plurality of speaker images, which represent the plurality of speakers broadcasting the audio signals from the audio mixer. The spatial locations of the audio signal visual images relative to the plurality of speaker images correspond to perceived spatial characteristics of the audio signals broadcasted from the plurality of speakers.

In yet another aspect of the present invention, a system for mixing a plurality of audio signals includes an audio mixer having a plurality of channels each of which for receiving one of a plurality of audio signals, and for varying audio characteristics of the received audio signal, and for outputting the varied audio signal. A microcomputer system includes a signal processing unit for transforming each audio signal into an audio signal visual image for display on a video display monitor. Each of the audio signal visual images has visual characteristics that correspond to the audio characteristics of the corresponding audio signal. The signal processing unit also performs frequency analysis on each of the audio signals to detect even and odd harmonic components thereof. The signal processing unit places a first type of texturing image on the corresponding audio signal visual images for detected even harmonic components, and a second type of texturing image on corresponding audio signal visual images for detected odd harmonic components.

In yet still another aspect of the present invention, a system for mixing a plurality of audio signals includes an audio mixer having a plurality of channels each of which for receiving one of a plurality of audio signals, and for varying audio characteristics of the received audio signal, and for outputting the varied audio signal. A microcomputer system includes a signal processing unit for transforming a selected audio signal into an audio signal visual image for display on a video display monitor. The audio signal visual image is segmented into portions that correspond to preselected frequency ranges. The frequency components of the selected audio signal are dynamically correlated with, and visually displayed with dynamic visual characteristics in, corresponding segmented portions of the audio signal visual image.

In one last aspect of the present invention, an article of manufacture is used with a computer system, an audio mixer having a plurality of channels each of which for receiving one of a plurality of audio signals and for varying audio characteristics of the received audio signal and for outputing the varied audio signal, an effects processing unit associated with each of the channels for adding audio effects to the audio signals, and a plurality of speakers that broadcast the audio signals outputed by the audio mixer. The article of manufacture includes a computer usable medium having computer readable program code means embodied therein for creating visual images of audio signals and audio effects. The computer readable program code means in the article of manufacture includes a computer readable program code means for causing the computer to transform each audio signal into an audio signal visual image and to display the audio signal visual images on a video display monitor. Each of the audio signal visual images has visual characteristics that correspond to the audio characteristics of the corresponding audio signal. The computer readable program code means in the article of manufacture further includes a computer readable program code means for causing the computer to generate audio effect images and to display the audio effect images on the video display monitor. The audio effect images have visual characteristics that correspond to audio effects added to the audio signals by an effects processing unit.

A better understanding of the features and advantages of the present invention will be obtained by reference to the following detailed description of the invention and the accompanying drawings which set forth an illustrative embodiment in which the principles of the invention are utilized.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF THE INVENTION

The present invention provides a system for mixing audio signals whereby the audio signals are transformed into visual images and the visual images are displayed as part of a three-dimensional volume of space on a video display monitor. The characteristics of the visual images, such as shape, size, spatial location, color, density and texture are correlated to selected audio characteristics, namely frequency, amplitude and time, such that manipulation of a visual characteristic causes a correlated response in the audio characteristic and manipulation of an audio characteristic causes a correlated response in the visual characteristic. Such a system is particularly well suited to showing and adjusting the masking of sounds in a mix.

Figure 1:
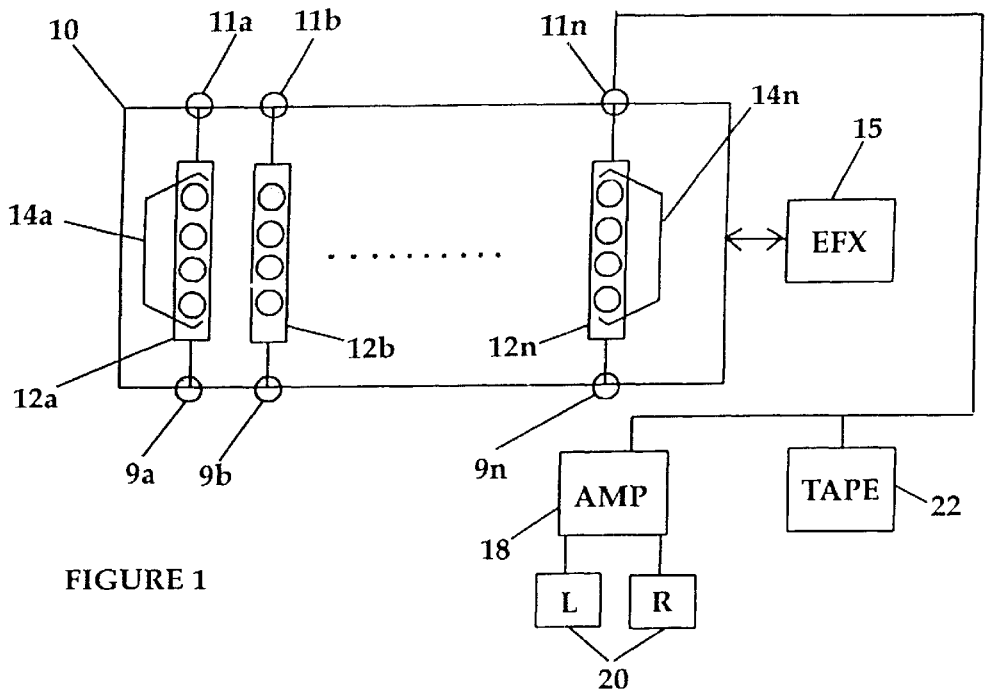
FIG. 1 is a block diagram of a conventional audio mixing system.

Referring now to FIG. 1, a block diagram of a conventional audio mixing system is illustrated. The heart of the system is a mixing console 10 having a plurality of channels 12a through 12n, each having an input 9, an output 11, and user controls 14a through 14n. The user controls 14 allow individual control of various signal characteristics for a channel, such as gain, effects, pan and equalization. The mixing console 10 may be any existing analog, digital or MIDI mixing console. For example, preferred analog mixing consoles are made by Harrison and Euphonics, preferred digital consoles are made by Solid State Logic and Neve, and preferred MIDI mixing consoles include Mackie, Tascam, Yamaha's 02R, and Yamaha's Pro Mix 1 mixer.

Sound signals may be provided to the mixing console 10 by various analog or digital audio sources (not shown), such as microphones, electric instruments, MIDI instruments, or other audio equipment, such as a multitrack tape deck, and each sound signal is therefore connected to a single channel 12. Preferred MIDI sequencers include Performer V 6 made by Mark of the Unicorn, Vision made by Opcode Systems, and Logic Audio made by Emagic. Preferred analog multitrack tape decks include those made by Studer A80, A827, Ampex MI 100/1200, MCI JH24, Otari, or Sony. Preferred digital multitrack tape decks include those made by Sony, Mitsubishi, Alesis' ADAT and Tascam's DA88. Preferred digital to hard disk multitrack decks include Dyaxis by Studer, Pro-Tools by Digidesign, and Sonic Solutions.

Signals from the mixing console 10 may also be sent to an effects and processing unit (EFX) 15 using the send control and the returned signal is received into another channel of the console. Preferred effects and processing units include the Alesis "Quadraverb", Yamaha's "SPX90II", Lexicon's 480L, 224, LXP1, LXP5, and LXP15.

The output signals 11 from the mixing console 10 are available from each channel 12. The final mix will generally comprise a two channel stereophonic mix which can be recorded on storage media, such as multitrack tape deck 22, or driven through amplifier 18 and reproduced on speakers 20.

Figure 2:
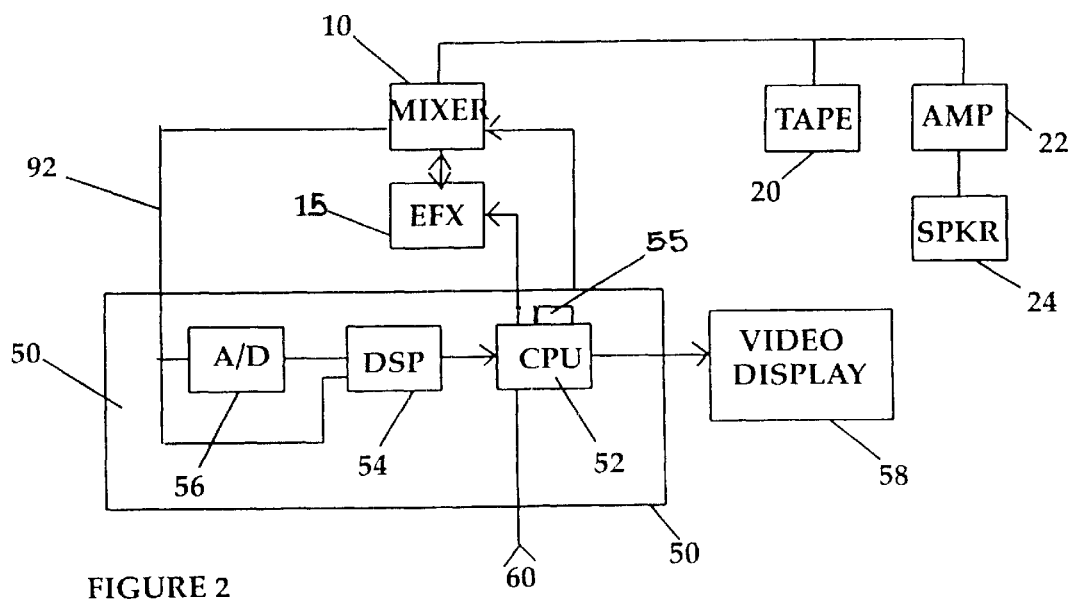
FIG. 2 is a block diagram of an audio mixing system constructed in accordance with the present invention.

Referring now to FIG. 2, and in accordance with the present invention, a microcomputer system 50 is added to the mixing system. The microcomputer system 50 includes a central processing unit (CPU) 52, a digital signal processing unit (DSP) 54, and an analog-to-digital converter (A/D) 56.

Sound signals are intercepted at the inputs 9 to the mixing console 10, then digitized, if necessary, by A/D unit 56. A/D unit 56 may be any conventional analog-to-digital converter, such as that made by DigiDesigns for its Pro Tools mixer, or by Sonic Solutions for its mixer. The output of the A/D unit 56 is then fed to the DSP unit 54.

The DSP unit 54 transforms each digitized sound signal into a visual image, which is then processed by CPU 52 and displayed on video display monitor 58. The displayed visual images may be adjusted by the user via user control 60.

The preferred DSP unit 54 is the DSP 3210 chip made by AT&T. The preferred CPU 52 is an Apple Power Macintosh having at least 16 Mb of memory and running the Apple Operating System 8.0. A standard automation or MIDI interface 55 is used to adapt the ports of the microcomputer system 50 to send and receive mix information from the mixing console 10. Opcode Music System by Opcode Systems, Inc., is preferably used to provide custom patching options by menu.

The CPU 52 and DSP unit 54 must be provided with suitable software programming to realize the present invention. The details of such programming will be straightforward to one with ordinary skill in such matters given the parameters as set forth below, and an extensive discussion of the programming is therefore not necessary to explain the invention.

Figure 3:
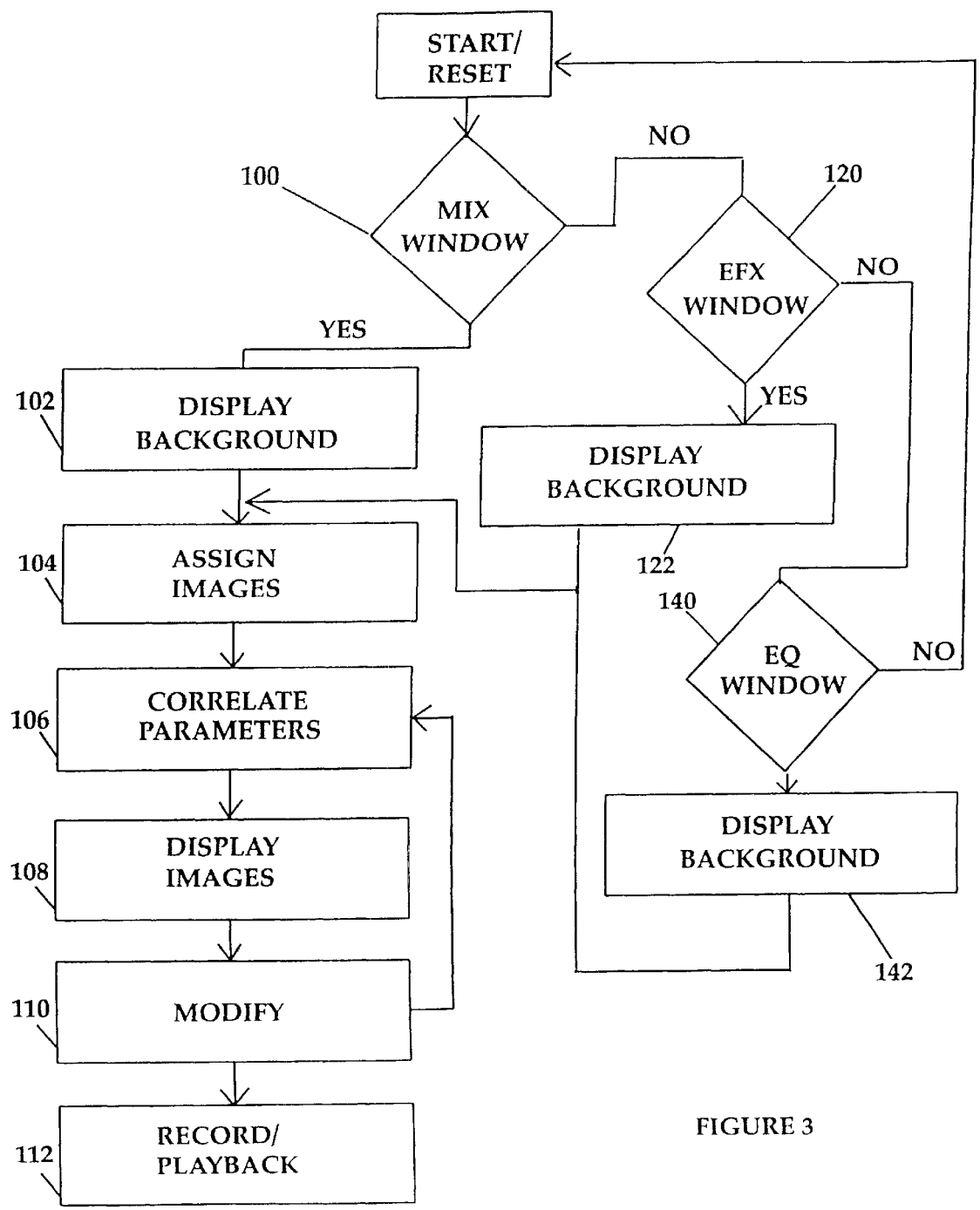
FIG. 3 is a flow chart illustrating the basic program implemented in the audio mixing system of FIG. 2.

Referring now to FIG. 3, the user is provided with a choice of three "windows" or visual scenes in which visual mixing activities may take place. The first window will be called the "mix window" and may be chosen in step 100. The second window will be called the "effects window" and may be chosen in step 120. The third window will be called the "EQ window" and may be chosen in step 140. The choices may be presented via a pull-down menu when programmed on an Apple system, as described herein, although many other variations are of course possible.

In the mix window, a background scene is displayed on the video display monitor 58 in step 102. Each channel 12 is then assigned a predefined visual image, such as a sphere, in step 104. Each visual image has a number of visual characteristics associated with it, such as size, location, texture, density and color, and these characteristics are correlated to audio signal characteristics of channel 12 in step 106. Each channel which is either active or selected by the user is then displayed on the video display monitor 58 by showing the visual image corresponding to the channel in step 108. The visual images may then be manipulated and/or modified by the user in step 110, i.e., the visual characteristics of the visual images are altered, thereby causing corresponding changes to the audio signal in accord with the correlation scheme in step 106. Finally, the mix may be played back or recorded on media for later play back or further mixing.

Figure 4:
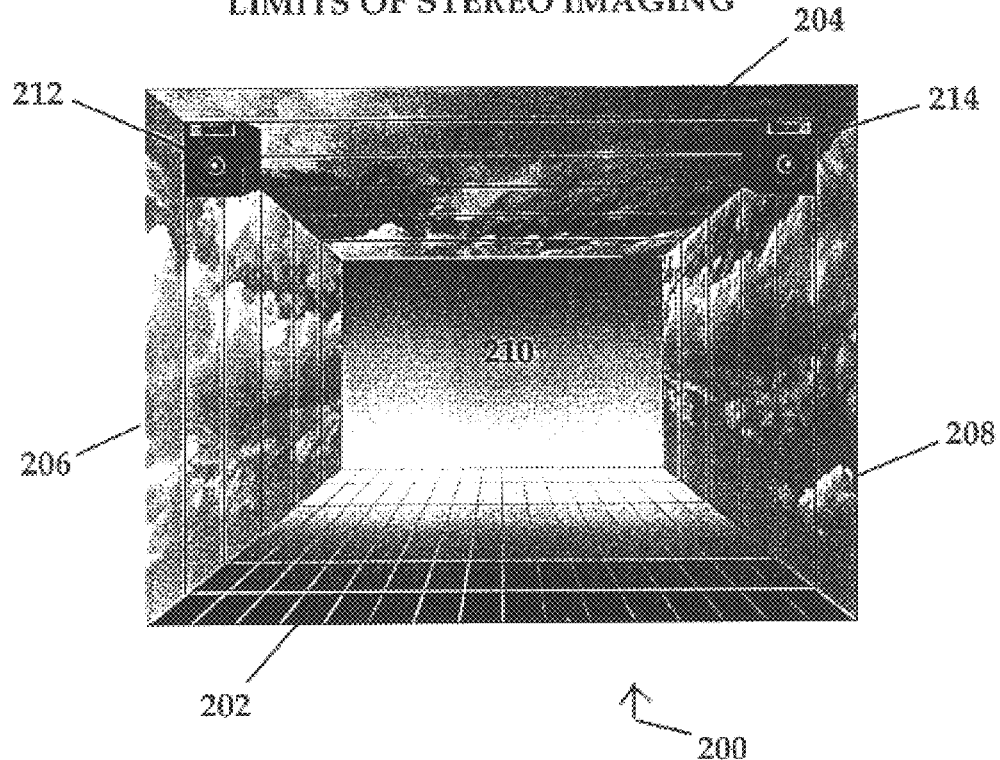
FIGS. 4 and 5 are views of the mix window.
Figure 5:
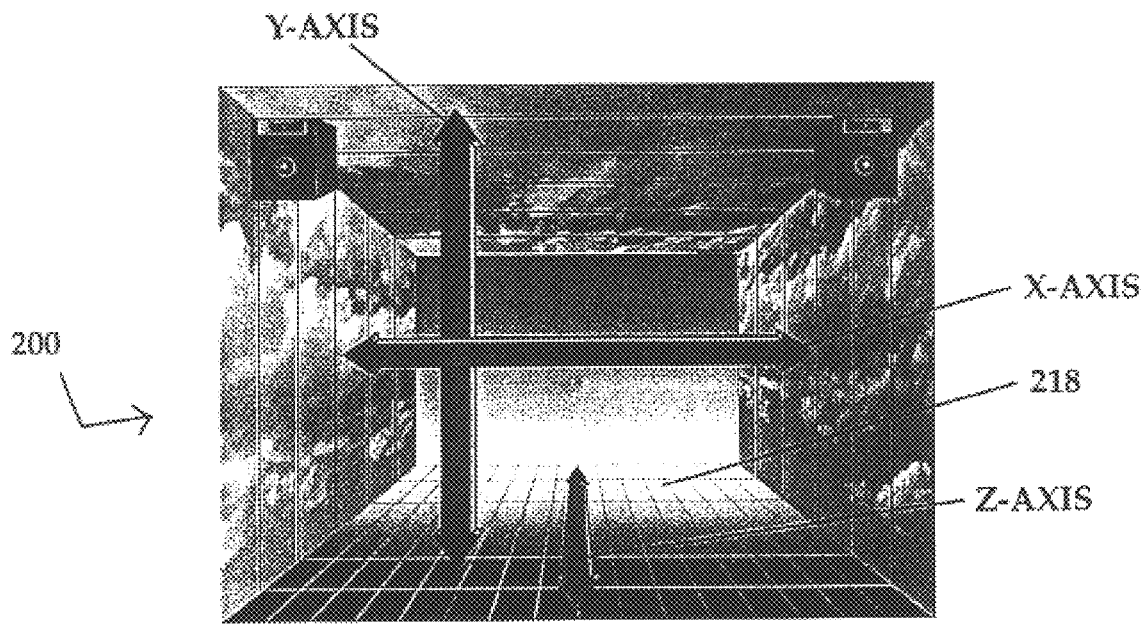

The preferred background scene for the mix window is illustrated in FIG. 4 and shows a perspective view of a three dimensional room 200 having a floor 202, a ceiling 204, a left wall 206, a right wall 208, and a back wall 210. The front is left open visually but nevertheless presents a boundary, as will be discussed shortly. Left speaker 212 and right speaker 214 are located near the top and front of the left and right walls, respectively, much like a conventional mixing studio. This view closely simulates the aural environment of the recording engineer in which sounds are perceived as coming from someplace between the speakers. A set of axes 218 is shown in FIG. 5 for convenient reference, wherein the x-axis runs left to right, the y-axis runs top to bottom, and the z-axis runs front to back, and manipulation of the visual images may be made with reference to a standard coordinate system, such as provided by axes 218.

In additional to simulating the aural environment of the recording engineer, the background scene provides boundaries or limits on the field of travel for the visual images of sounds. Generally, we perceive that sounds emanate from some place between the speakers. Thus, a visual image of a sound should never appear further left than the left speaker or further right than the right speaker. Therefore, the program uses either the left and right speakers, or the left and right walls, as limits to the travel of visual images. Sounds also usually seem to be located a short distance in front of the speakers. No matter how loud you make a sound in the mix, the sound image will not appear to come from behind the listener without adding another set of speakers or a three-dimensional sound processor. Likewise, the softest and most distant sounds in a mix normally seem to be only a little bit behind the speakers. Thus, the visual images as displayed by the present invention will ordinarily be limited by the front wall and the back wall. Further, no matter how high the frequency of a sound, it will never seem to be any higher than the speakers themselves. However, bass frequencies can often seem very low since they can travel through the floor to the listener's feet (but never below the floor). Therefore, the visual imaging framework is also limited by the top of the speakers and the floor.

In the preferred embodiment of the present invention, the shape of a dry audio signal is predefined to be a sphere. This shape is chosen because it simply and effectively conveys visual information about the interrelationship of different sounds in the mix. The other visual characteristics of the sphere, such as size, location, texture and density are made interdependent with selected audio characteristics of the source signal: size of the sphere is correlated to frequency and amplitude; x-location of the sphere is correlated to signal balance or pan control; y-location of the sphere is correlated to frequency; z-location of the sphere is correlated to volume or amplitude; texture of the sphere is correlated to certain effects and/or waveform information; and density of the sphere is correlated to amplitude. Of course, each audio signal parameter is dynamic and changes over time, and the visual images will change in accord with the correlation scheme employed. Likewise, user adjustments to the visual images must cause a corresponding change in the audio information. Typically, the DSP chip 54 will sample the audio parameters periodically, generating a value for each parameter within its predefined range, then the CPU 52 manages the updating of either visual or audio parameters in accord with the programmed correlation scheme. Such two-way translation of visual and MIDI information is described in U.S. Pat. No. 5,286,908, which is expressly incorporated herein by reference.

Figure 6:
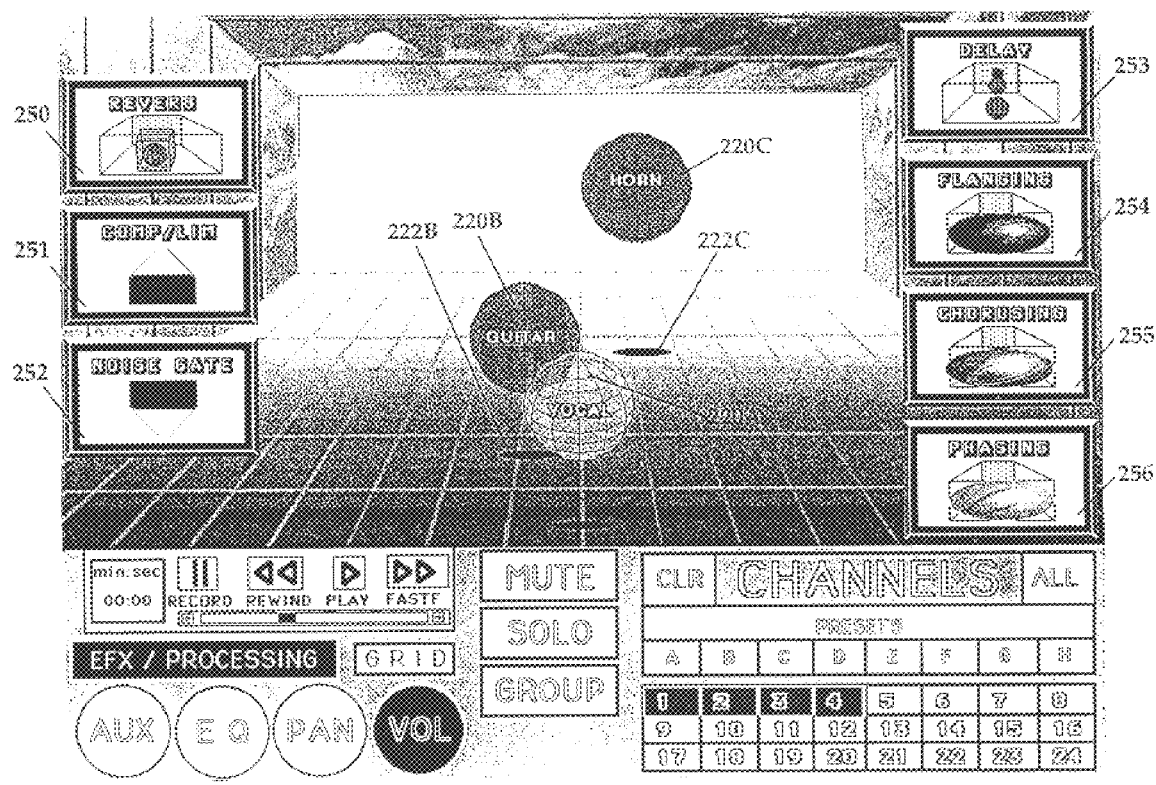
FIG. 6 is a detailed view of the mix window in the preferred embodiment including audio effects.

Referring now to FIG. 6, the mix window (shown inside the effects window to be described later) shows three spheres 220*a*, 220*b* and 220*c* suspended within the boundaries of room 200. Advantageously, shadows 222*a*, 222*b* and 222*c* are provided below respective spheres to help the user locate the relative spatial position of the spheres within the room.

In a preferred embodiment, the user control 60 (see FIG. 2) includes a touch sensitive display screen, such as Micro-touch screen, which permits to user to reach out and touch the visual images and manipulate them, as will now be described.

Any of the spheres 220*a*, 220*b*, or 220*c*, may be panned to any horizontal or x-position between the speakers by moving the image of the spheres on display 58. The spheres may also be moved up and down, or in and out. In the present embodiment, wherein the three-dimensional room is represented as a two-dimensional image, it is not practical to provide in/out movement along the z-axis, therefore, both of these adjustments have the same effect, namely, to increase or decrease amplitude or volume of the selected signal. However, it is conceivable that a holographic controller could be devised wherein adjustment in both the y-direction and z-direction could realistically be provided. In that case, one of the adjustments could control amplitude and one of the adjustments could control frequency.

Since it is possible for two sounds to be in the same spatial location in a mix and still be heard distinctly, the spheres should be transparent or translucent to some degree so that two sounds can be visually distinguished even though they exist in the same general location.

The spheres may also be given different colors to help differentiate between different types of sounds. For example, different colors may be assigned to different instruments, or different waveform patterns, or different frequency ranges.

The radial size of the sphere is correlated to the apparent space between the speakers taken up by a sound in the mix. Bass instruments inherently take up more space in the mix than treble instruments, and therefore the size of the sphere is also correlated to frequency. For example, when more than two bass guitars are placed in a mix, the resulting sound is quite "muddy," and this can be represented visually by having two large spheres overlapping. However, place ten bells in a mix at once and each and every bell will be totally distinguishable from the others, and this can be represented visually by having ten small spheres located in distinct positions within room 200. Therefore, images which correspond to bass instruments should be larger than images which correspond to treble instruments. Further, the images of treble instruments will be placed higher between the speakers, and they will also be smaller than images of bass instruments, which will in turn be represented by larger shapes and placed lower between the speakers.

Figure 7A:
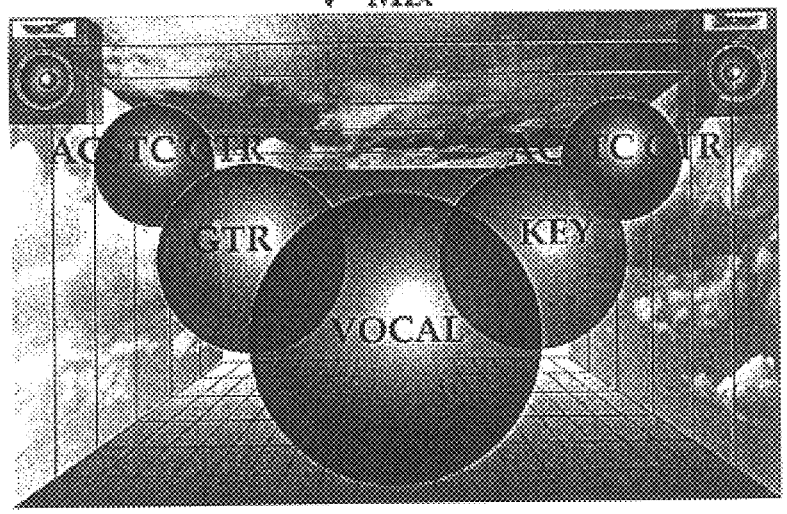
FIGS. 7a through 7d are views of mix windows illustrating the placement of spheres within the window to obtain different mix variations.
Figure 7B:
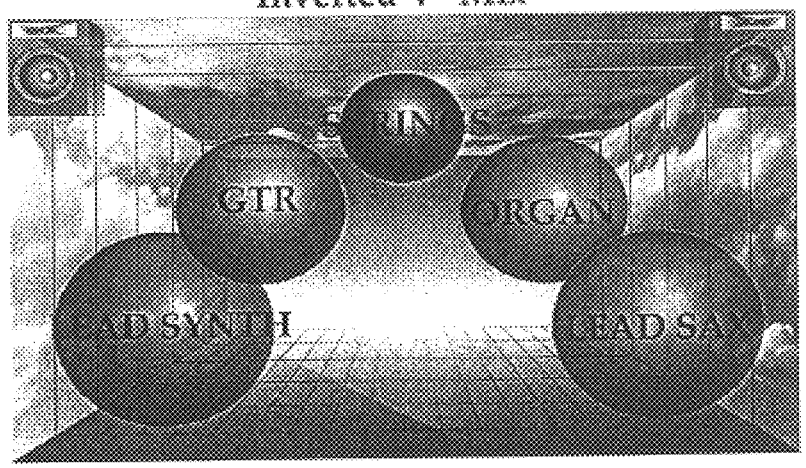
Figure 7C:
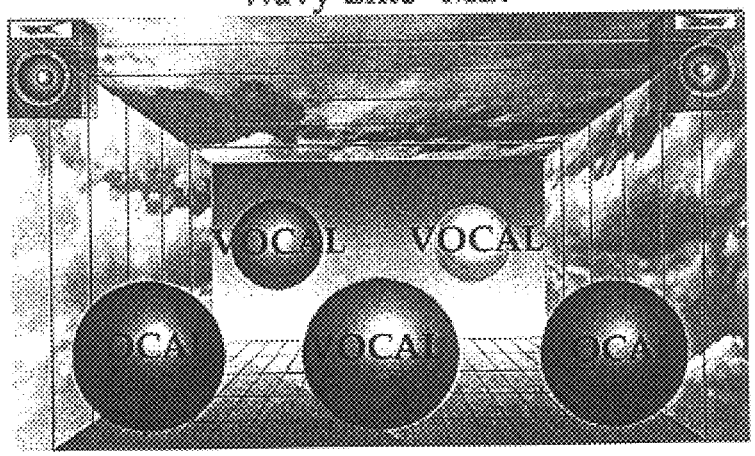
Figure 7D:
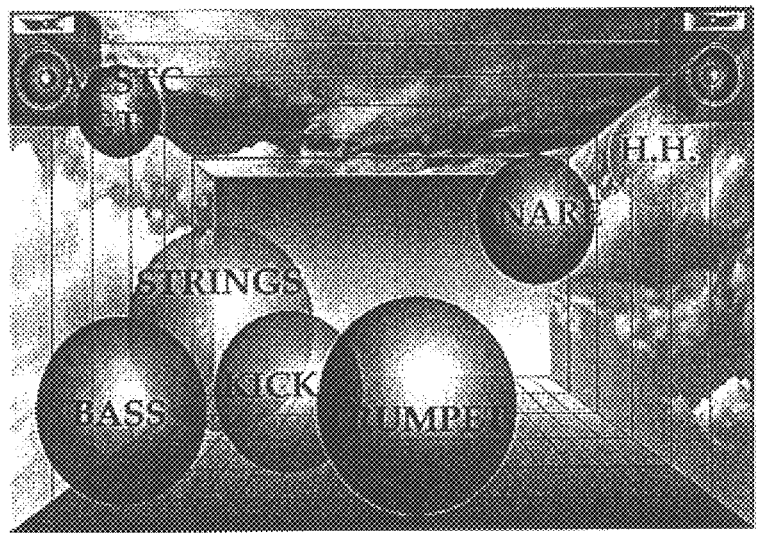

Examples of the types of visual mixes which may be obtained are shown in FIGS. 7*a* through 7*d* and FIGS. 8*a* through 8*c*. For example, in FIG. 7*a*, spheres corresponding to selected channels are arranged in a "V" formation. In FIG. 7*b*, spheres corresponding to selected channels are arranged in an inverted "V" formation. In FIG. 7*c*, spheres corresponding to selected channels are arranged to form a wavy line. In FIG. 7*d*, spheres corresponding to selected channels are scattered throughout the virtual room.

Figure 8A:
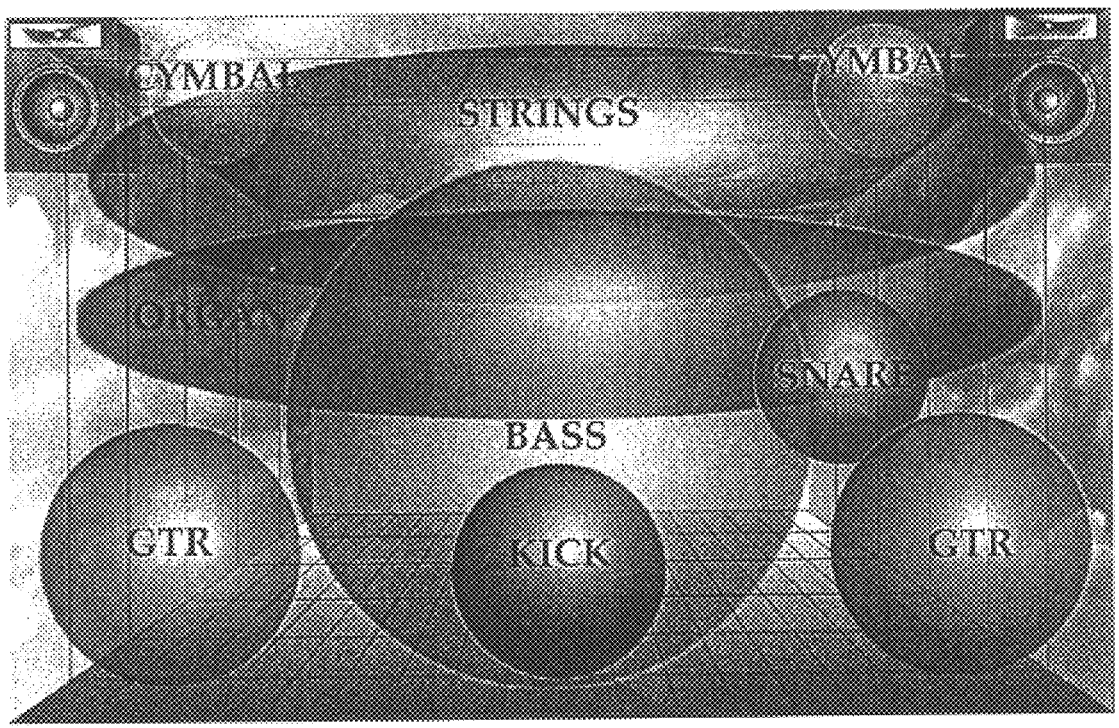
FIGS. 8a through 8c are views of mix windows illustrating the placement of spheres within the window to obtain different mix variations.
Figure 8B:
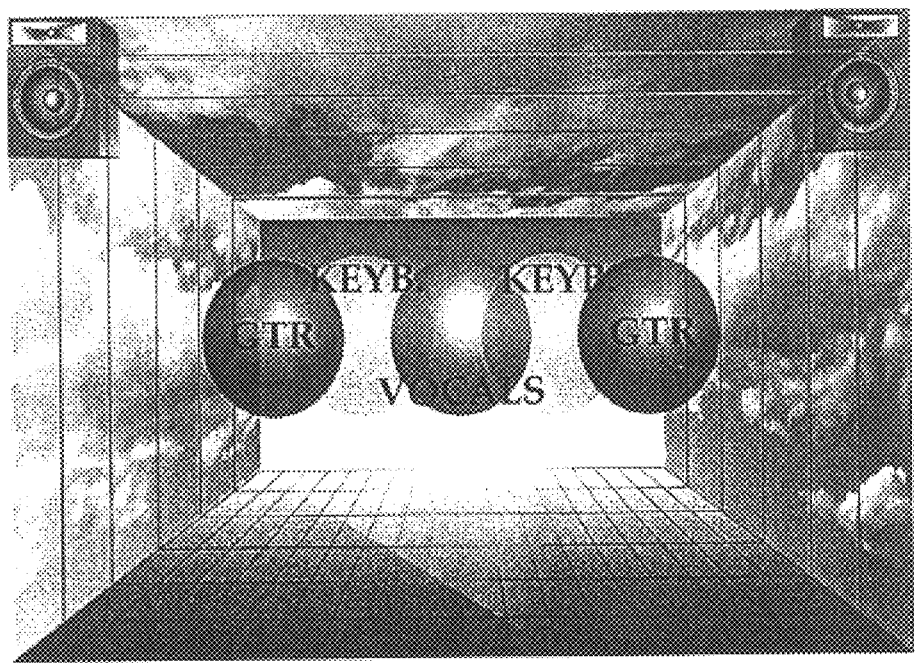
Figure 8C:
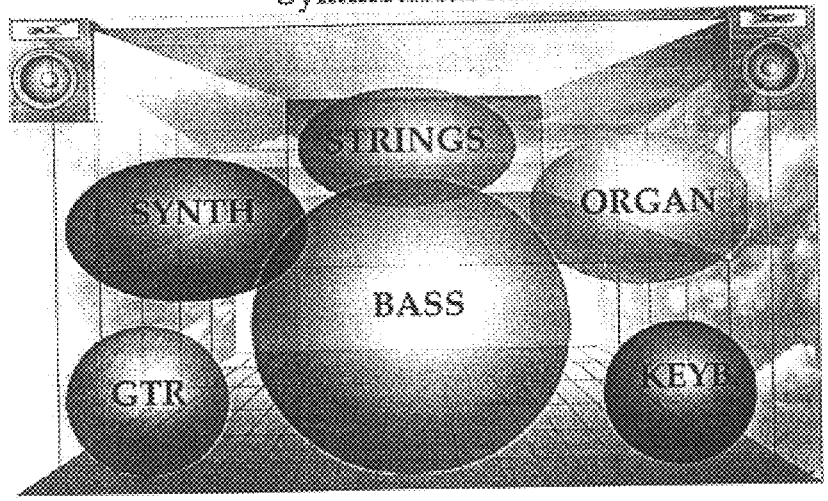

In FIG. 8*a*, spheres corresponding to selected channels are arranged in a simple structure to provide a clear and well organized mix. In FIG. 8*b*, spheres corresponding to selected channels are arranged to provide an even volume relationship between the selected channels. In FIG. 8*c*, spheres corresponding to selected channels are symmetrically arranged around the selected bass instrument channel. Many other mix variations could be represented by manipulating spheres accordingly.

Other audio parameters are also usually present in a mix, such as those provided by audio effects and processor unit 15. Referring back to FIG. 3, these parameters may be manipulated by selecting the effects window in step 120.

The effects window is illustrated in FIG. 6, in which seven icons 250, 251, 252, 253, 254, 255 and 256 are added to the mix window to allow user selection of the following standard audio effects processors: reverb, compressor/limiter, noise gate, delay, flanging, chorusing or phasing, respectively. All of these audio effects involve manipulating the amplitude, frequency and/or timing of the audio signals.

Figure 9:
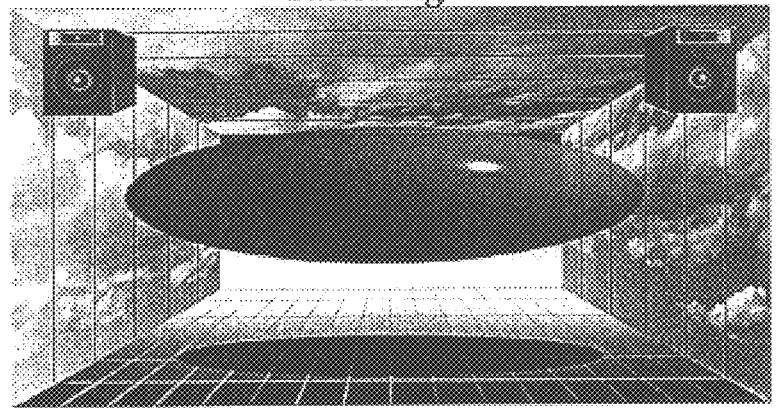
FIG. 9 illustrates a "fattened" sphere.
Figure 10A:
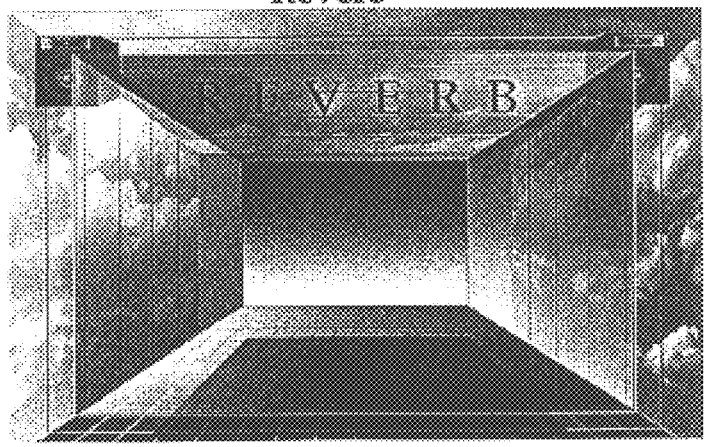
FIGS. 10a–10j are views of effects windows illustrating different reverb effects images.
Figure 11A:
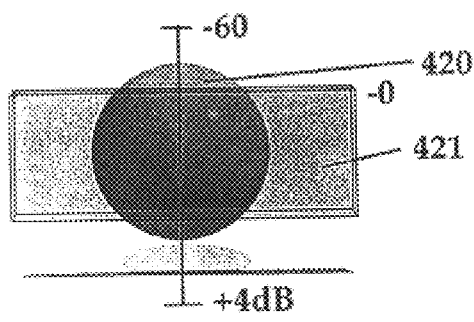
FIGS. 11a and 11b illustrate compression/limiter gate and a noise gate, respectively.
Figure 11B:
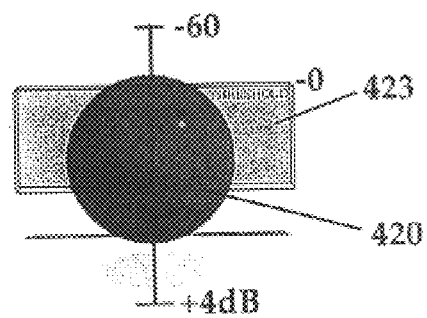
Figure 11C:
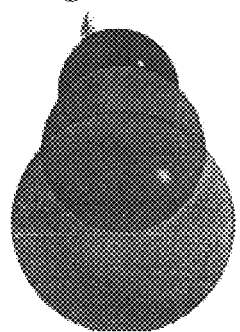
FIGS. 11c and 11d illustrate short and long delays, respectively.
Figure 11D:
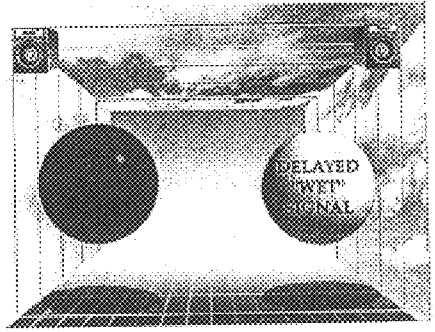

For example, delay can be represented by causing the sphere to diminish in intensity until it disappears as shown in FIG. 11*c*. An unusual effect is observed when the sound delay is less than 30 milliseconds. The human ear is not quick enough to hear the difference between delay times this fast, and instead we hear a "fatter" sound, as illustrated in FIG. 9, instead of a distinct echo. For example, when one places the original sound in the left speaker and the short delay in the right speaker, the aural effect is that the sound is "stretched" between the speakers, commonly called "fattening". A longer delay panned from left to right appears as illustrated in FIG. 11*d*. Fattening can be placed in various places in a mix: left to right (with a pan pot), front to back (with volume fader), or up and down (with an equalizer). The computer software calculates or reads the delay time on a sound. When the delay is longer than thirty milliseconds, two spheres such as in FIG. 11*d* are shown, and when the delay is less than thirty milliseconds, the two spheres of FIG. 11*d* will pull together and be shown as fattening as in FIG. 9.

When reverb is used in a mix, it adds a hollow empty room sound in the space between the speakers and fills in the space between the different sounds. Depending on how the reverb returns are panned, the reverb will fill different spatial locations in the mix. Therefore, according to the present invention, reverb will be displayed as a second type of predefined visual image, separate and apart from the spheres. In the preferred embodiment, a transparent cube or cloud is selected as the image for the reverb audio effect, and the cloud fills the spaces between sounds in the mix, as illustrated in FIG. 10. The length of time that a reverb cloud remains visible corresponds to the reverb time. Like the spheres, the clouds will also have a degree of transparence or translucence that may be used, for example, to display changes in volume of the reverb audio effect. Naturally decaying reverb, where volume fades, can be shown by decreasing intensity.

The color of the reverb cloud is a function of which sound is being sent out to create the reverb, i.e., which instrument is being sent out to the reverb audio effect processor via the auxiliary send port of the mixer. The color of the reverb cloud corresponds to the color of the sound sphere. If the reverb audio effect covers more than one instrument, the color of the reverb cloud may be a combination of the individual colors.

Each of the parameters within reverb units are also displayed visually based on the original mapping: volume= front and back, panning=left and right, and frequency=up and down. These parameters include Reverb Time, Predelay time, Diffusion, Reverb EQ, Early Reflections and Envelope. Although each of these parameters are shown in real time, when setting time functions with a static visual, time is displayed differently.

Figure 10B:
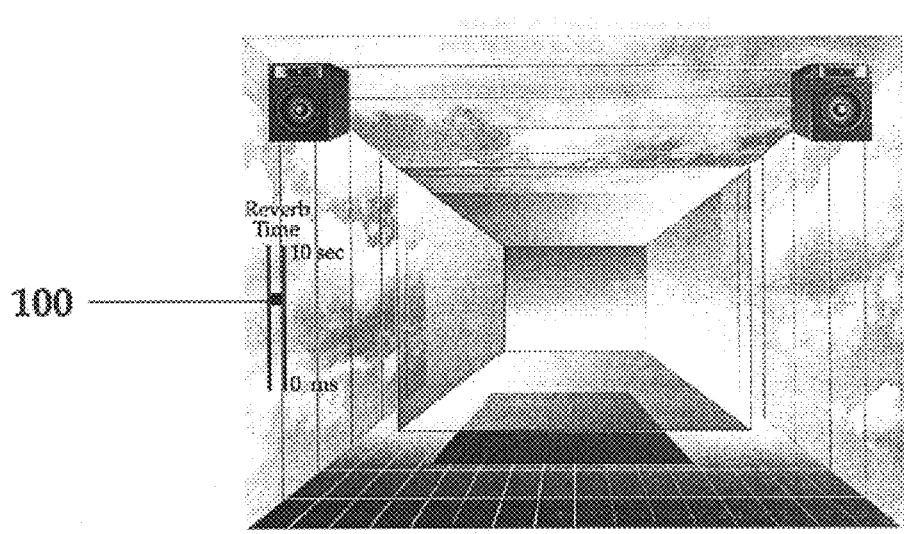
Figure 10C:
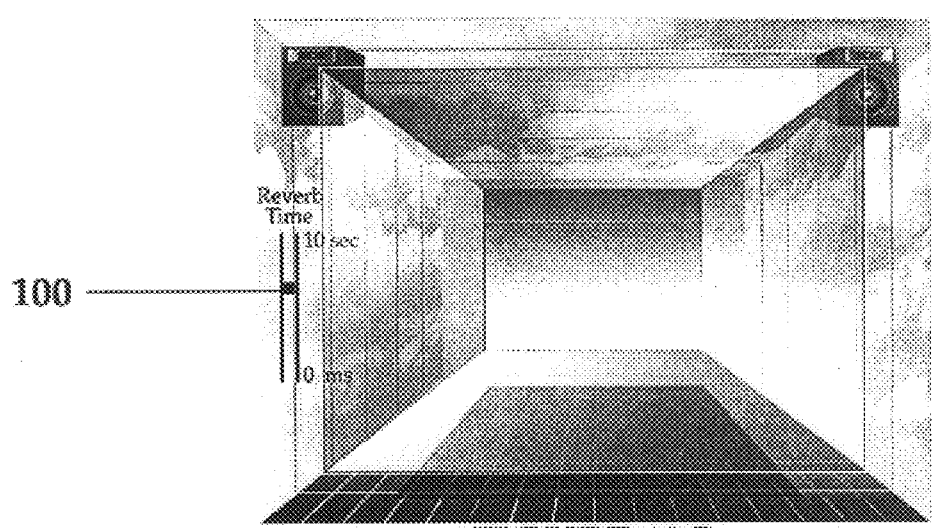

The duration of the Reverb (Reverb Time) is set in two ways. First, the size of the room is a function of the reverb time, as shown in FIGS. 10b and 10c. The reverb time may be lengthened by clicking anywhere on the cube and dragging up. Dragging down shortens the reverb time. Second, the reverb may be set by moving a slider 100 which also changes the size of the cube.

Figure 10D:
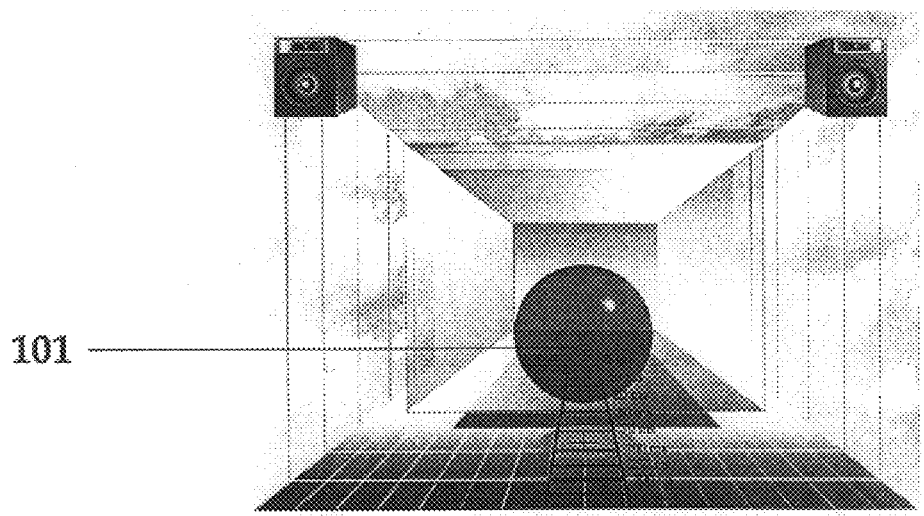

Predelay Time is shown as a grid of delay times as shown in FIG. 10d. The sphere 101 can be moved front to back by moving the mouse up (back) or down (front). The crosshair on the shadow of the sphere shows the exact reverb predelay time corresponding to the sphere's position.

Figure 10E:
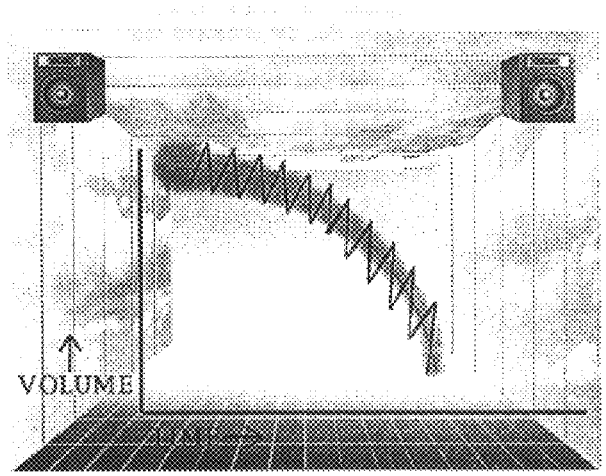
Figure 10F:
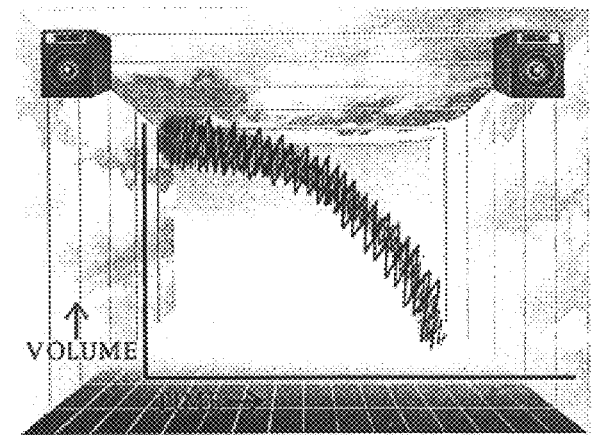

The Diffusion setting is shown as the distance between respective echoes as illustrated in FIGS. 10e and 10f. Dragging the mouse to the right decreases the number of echoes and expands the distance between individual echoes, which corresponds to a lower diffusion. Dragging the mouse to the left increases the number of echoes and contracts the distance between individual echoes, which corresponds to a higher diffusion.

Figure 10G:
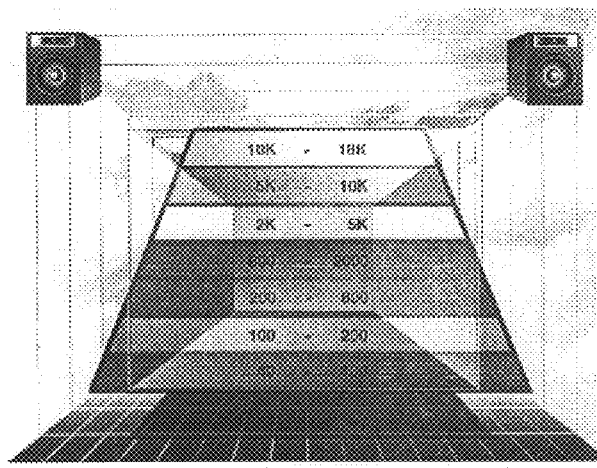

The Reverb EQ setting displays the equalization over the reverb cube, as illustrated in FIG. 10g. The EQ of the reverb is set the same way that normal EQ of a sound is set (as described below).

Figure 10H:
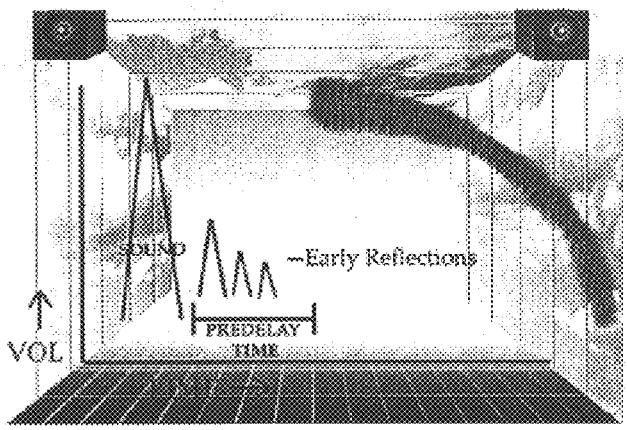

Early Reflections are shown as individual echoes within the predelay time as in FIG. 10h. The early reflection delay timers may be set by clicking on and dragging the individual echoes left or right. The volume of the early reflections may be raised or lowered by dragging the mouse up (louder in volume) or down (softer in volume).

Figure 10I:
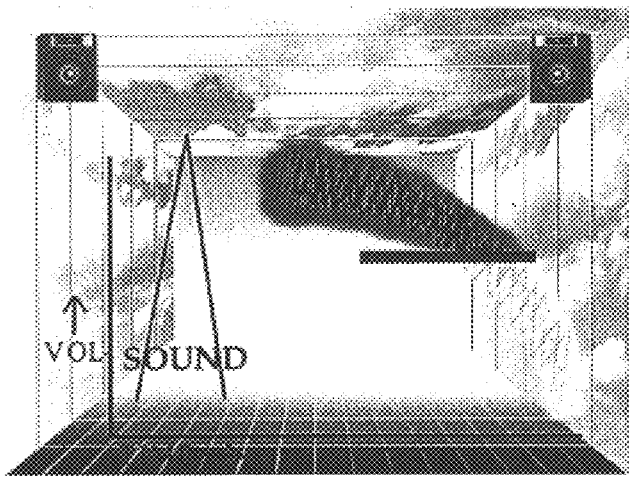
Figure 10J:
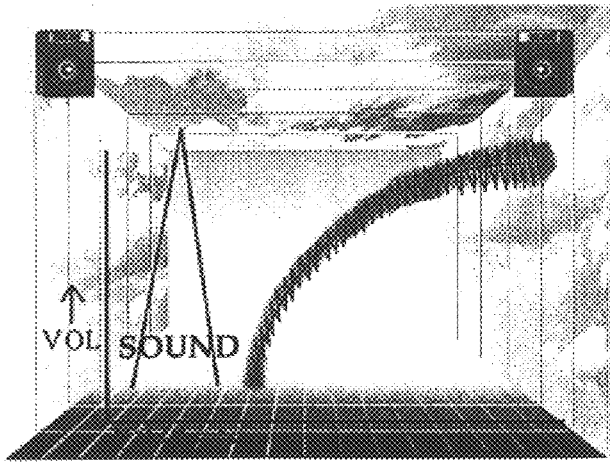

Gated reverb, where volume is constant, may be shown by constant intensity, then abrupt disappearance as illustrated in FIG. 10i. Reverse gated reverb, where volume rises, may be shown by increasing intensity, as illustrated in FIG. 10j. In this way, the various reverb audio effects are clearly and strikingly displayed in real time.

Figure 14:
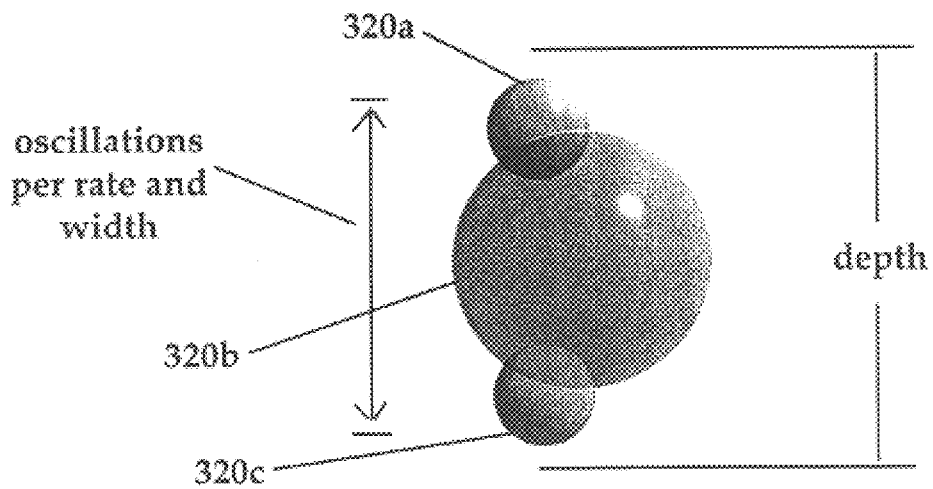
FIG. 14 illustrates a phase shifter, flanger or chorus effect.

Visual images for phase shifters, flangers and choruses are chosen to be the same since the audio parameters for each of these audio effects are the same. According to the preferred embodiment, there are two ways in which these audio effects may be shown. First, two spheres can be shown one in front of the other, as illustrated in FIG. 14, wherein the back sphere 320a oscillates up and down immediately behind the front sphere 320b. Second, the sphere can be shown as having a ring inside of it, wherein sweep time is displayed visually by rotating the ring in time to the rate of the sweep, as shown by icons 254–256 in FIG. 6. The depth of the audio effect, i.e., width or intensity, can be shown as ring width.

The image used to represent compressor/limiter audio effects is a sphere 420 having a small transparent wall 421 in front of it, as illustrated in FIG. 11a. Using the z-axis dimension to represent volume, the compression threshold is represented by the wall 421. Any signal volumes louder (closer) than the threshold will be attenuated based on the selected ratio setting.

Likewise, noise gates can be represented by placing a small transparent wall 423 immediately behind the sphere 420, as illustrated in FIG. 11b. Thus, when volume is correlated to the z-axis, the noise gate threshold will be represented by the wall 423. As with compressor/limiters, attack and release settings would be strikingly visible.

Figure 12:
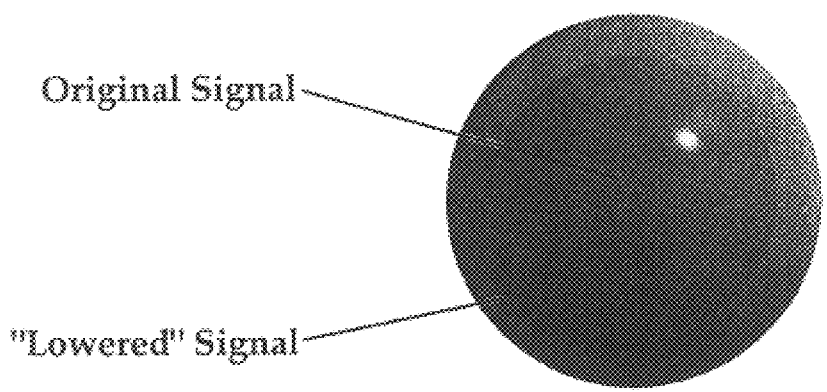
FIG. 12 illustrates a harmonizer effect.

A harmonizer audio effect, i.e., raising or lowering the pitch, is preferably shown as a smaller or larger sphere in relation to the original sphere, as illustrated in FIG. 12. The second "harmonized" sphere may be dragged up to raise the pitch, or down to lower the pitch of the sound. The sphere also becomes smaller in circumference as it is raised, and larger in circumference as it is lowered.

Figure 13:
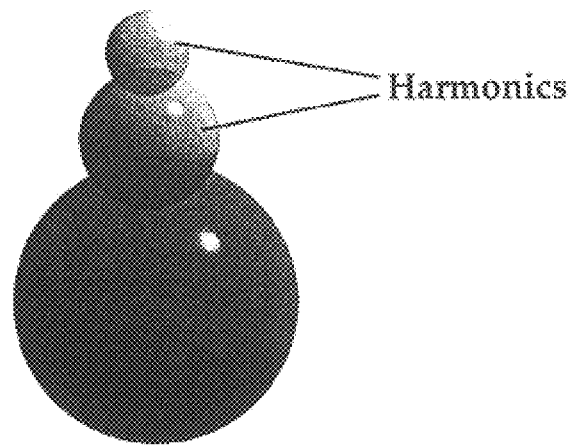
FIG. 13 illustrates an aural exciter effect.

An aural exciter or enhancer can be represented by stacking spheres on top of each other, as illustrated in FIG. 13. The top spheres decrease in size since they represent the harmonics that enhancers add.

The audio effects are selectable and a control icon is provided to allow selection and modification of the audio effect. For example, as shown in FIG. 6, the audio effects window may be selected to show every option which is available to the user.

Figure 15A:
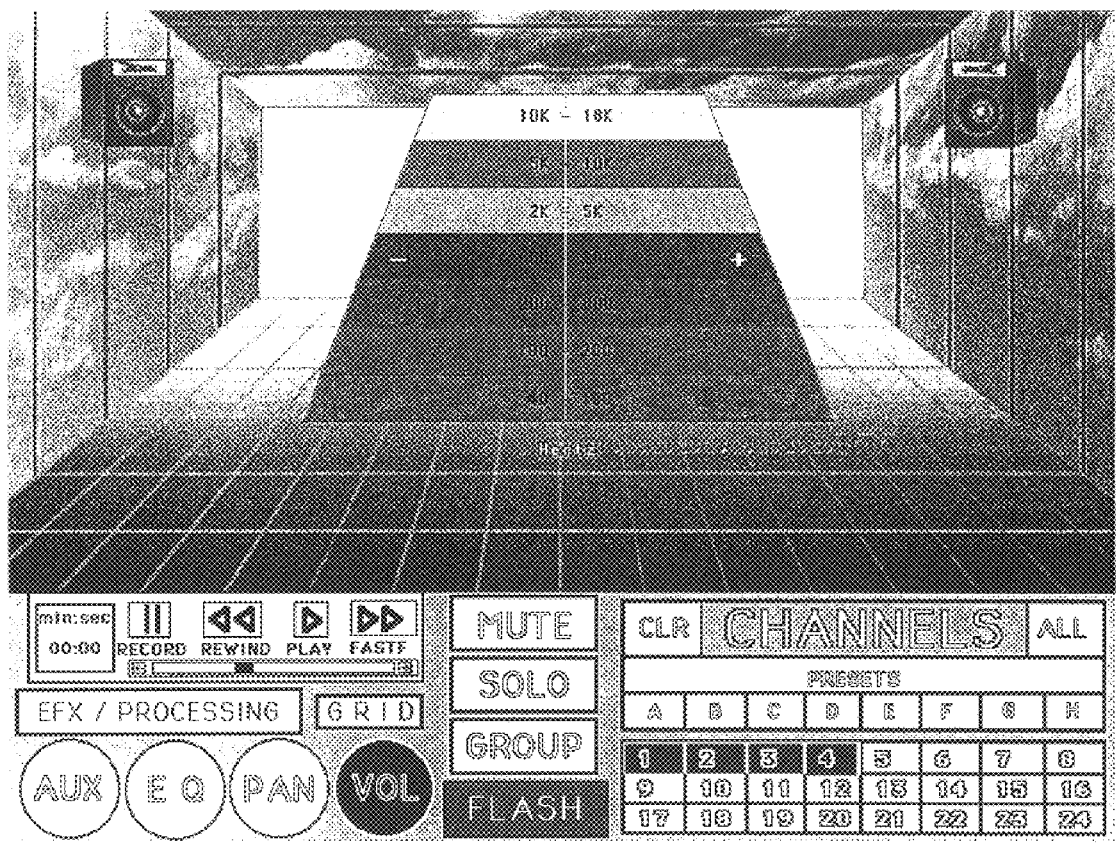
FIGS. 15a–15b illustrate EQ windows.

Returning to FIG. 3, the user can choose to enter the EQ window at step 140. In the EQ window, each selected instrument is presented as a spectrum analysis. In the preferred embodiment, an inverted triangular shape is used to show the frequency spectrum as shown in FIG. 15. Since high frequencies take up less space in the mix, the triangular shape gets smaller as the frequency gets higher. Further, while the conceptual shape is triangular, the practical implementation is a trapezoid so as to provide a visually discernible portion for the highest frequency range of interest. Volume can once again be displayed as either movement along the z-axis or as color intensity. Using volume as a function of dynamic color intensity will be the most useful for comparing the relationships of equalization, frequency spectrum and harmonic structure. On the other hand, using volume as a function of dynamic z-axis movement will be more convenient to precisely set equalization curves. The volume and balance can be changed by moving the EQ trapezoid left/right and forward/back, respectively.

Bandwidth is shown as a function of the height of each particular band. The bandwidth may be changed by either clicking on a band while holding down a function key on the keyboard, and dragging up to make the bandwidth thinner, or down to make the bandwidth wider.

Figure 15B:
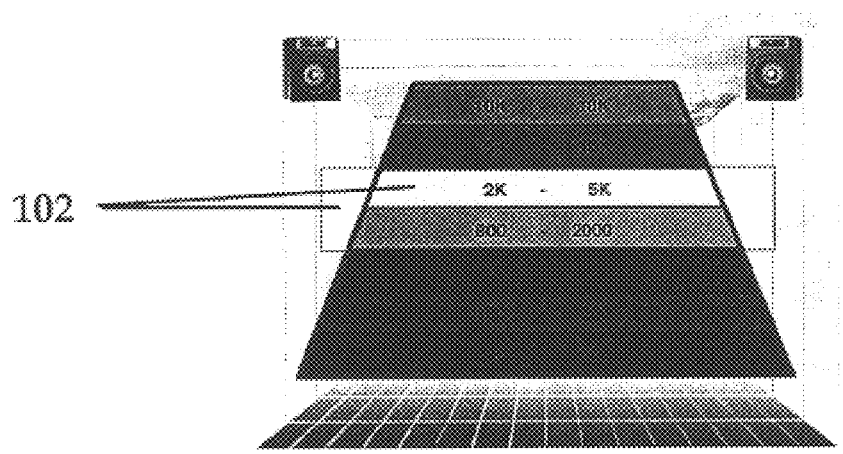

Alternately, there is another way to manipulate the EQ settings. As illustrated in FIG. 15b, there is a highlighted window (102) which may independently be moved up or down to select a frequency range for raising or lowering volume. The bandwidth of this frequency selection window may be widened or narrowed in the same way as described above. Activating the right side of the highlighted window 102 increases that frequency range's relative volume, and activating the left side of the highlighted window 102 decreases that frequency range's relative volume.

Showing the frequency spectrum of each instrument in this manner helps to solve the biggest problem that most people have in mixing: equalizing instruments relative to each other and understanding how the frequencies of instruments overlap or mask each other. When more than one instrument or the whole mix is shown, the relationships between the frequency spectrum and harmonics of the instruments becomes strikingly evident. In a good mix, the various frequency components of the sound are spread evenly throughout the frequency spectrum. When two instruments overlap, the color bands will overlap. If both instruments happen to be localized in the midrange, the overlapped color bands will become very dense and darker in color. The problem may be solved both aurally and visually by playing different instruments, or by changing the arrangement, or by panning or equalizing the sounds.

Showing spheres (including oblong spheres, cubes and clouds) with smooth textures is helpful to simplify the large amount of information being shown in a complex mix of many sounds. Smooth textures (or no texture at all) also makes it easier for slower computers to be able to process the flashing of the images quicker.

However, showing the textures of the spheres as a function of the waveform provides a more realistic representation of the apparent masking that occurs in a mix.

Figure 16A:
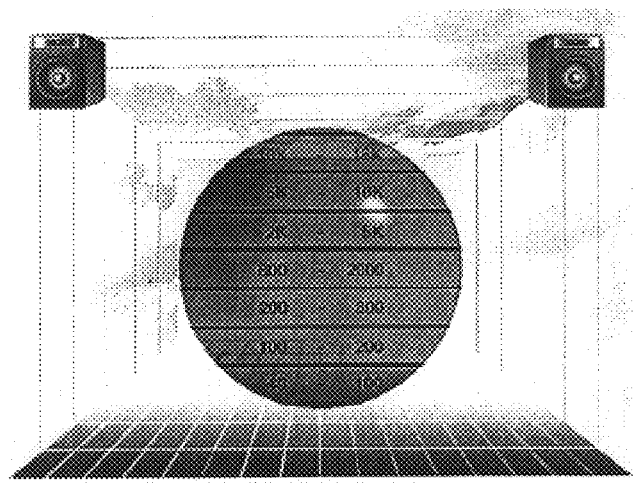
FIGS. 16a–16d illustrate odd and even harmonic effects.

The waveform or timbre of a sound can be broken down into a combination of pure sine wave frequencies or harmonics (i.e. the well known Fourier analysis). These frequencies are then mapped onto a sphere as a function of height position on the sphere as illustrated in FIG. 16a. The frequencies from 20 Hz to 20,000 Hz are mapped from bottom to top of the sphere, respectively.

Figure 16B:
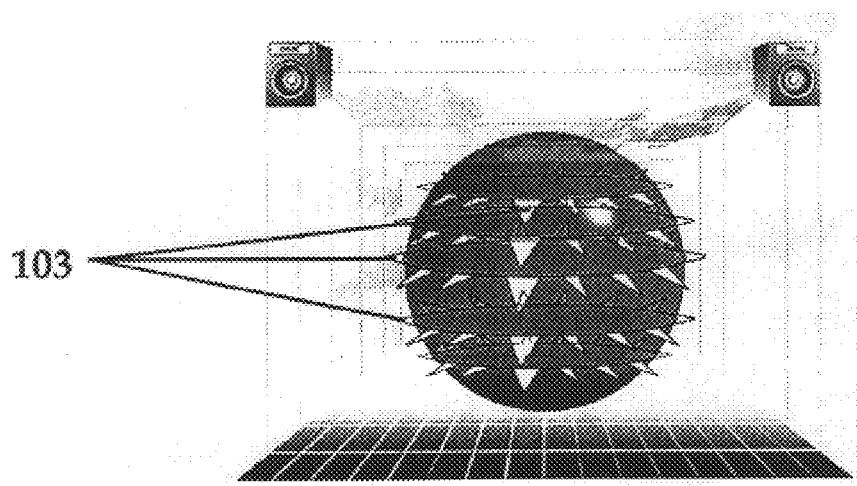
Figure 16C:
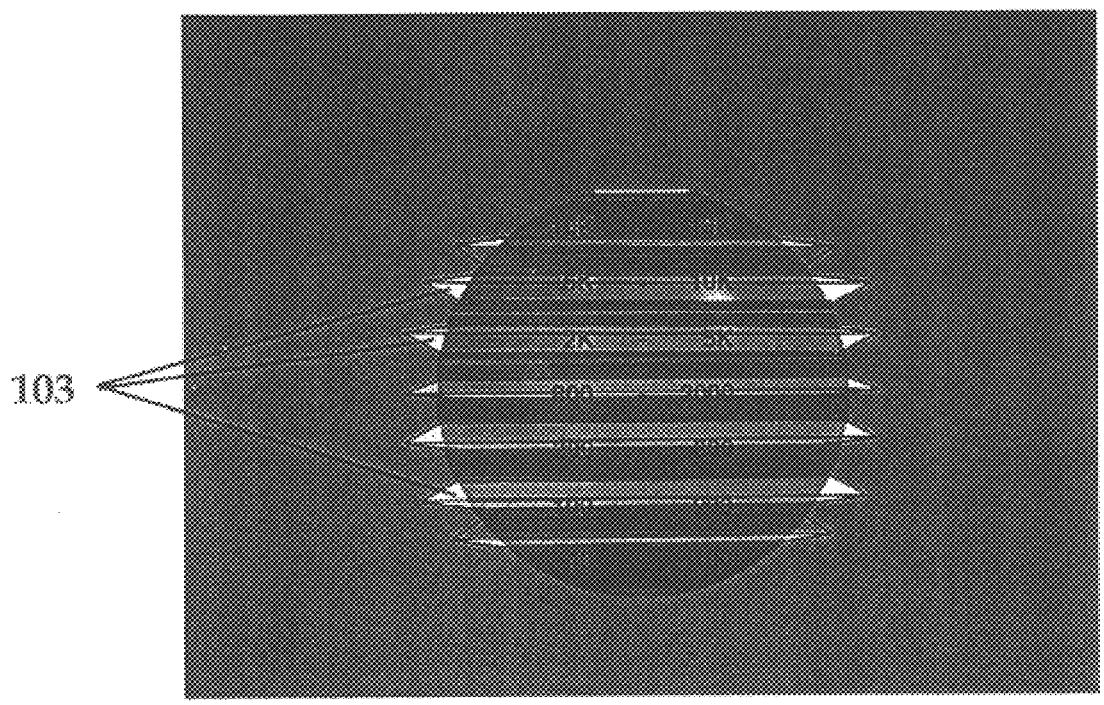
Figure 16D:
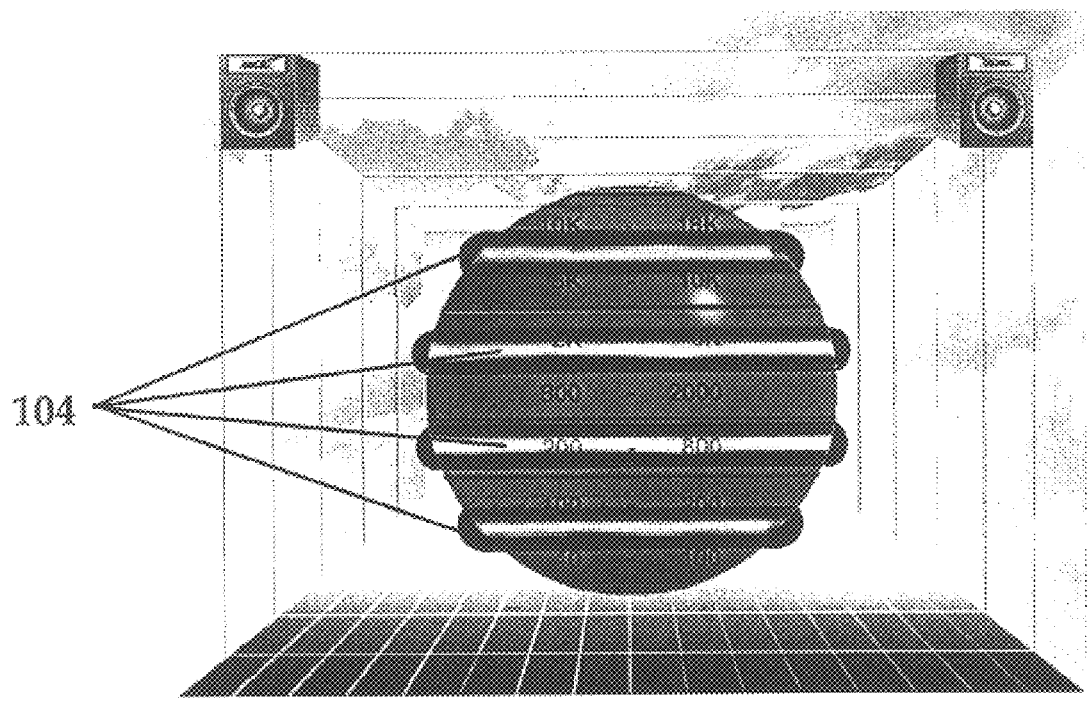

The volume of each harmonic tone is shown as a function of surface protrusions on the sphere, as illustrated in FIGS. 16b–16d. The louder the harmonic, the number and/or size of the corresponding protrusions jutting out from the surface of the sphere on all sides increases. The height position of the protrusions on the sphere corresponds to the particular frequency of the harmonic.

In order to show the psychoacoustic difference between odd and even numbered harmonics, the protrusions for odd and even harmonics will jut out from the sphere in different shapes. Odd harmonics produce irritating and edgy type sounds, so protrusions corresponding to odd harmonics appear as spiked protrusions 103 jutting out of all sides of the sphere, as illustrated in FIGS. 16b or 16c. Even harmonics produce warm and round sounds, so protrusions corresponding to even harmonics appear they appear as rounded protrusions 104 jutting out of all sides of the sphere, as illustrated in FIG. 16d.

Thus, a sound like a distorted electric guitar will produce a rough and pointed texture on the sphere, whereas a flute will produce a texture that is smoother with smoothed protrusions. Sounds with more odd harmonics will "stick out" more visually in a mix with many sound spheres, just as it does psychoacoustically in an audio stereo mix.

To accomplish sphere texturing, the audio signal is put into a common computerized processor that performs a Fourier Analysis, which splits the signal into multiple frequencies. In the software, each of the frequencies is calculated as a function of circumference. The following table illustrates the algorithm for calculating spiked protrusions versus rounded protrusions, as well as the height positions of the protrusions on the sphere.

TABLE 1

| Harmonic # | Protrusion Height Position (Sphere Height = H) | Protrusion Type |
| --- | --- | --- |
| 17 | H × .90 | Spiked |
| 16 | H × .85 | Rounded |
| 15 | H × .80 | Spiked |
| 14 | H × .75 | Rounded |
| 13 | H × .70 | Spiked |
| 12 | H × .65 | Rounded |
| 11 | H × .60 | Spiked |
| 10 | H × .55 | Rounded |
| 9 | H × .50 | Spiked |
| 8 | H × .45 | Rounded |
| 7 | H × .40 | Spiked |
| 6 | H × .35 | Rounded |
| 5 | H × .30 | Spiked |
| 4 | H × .25 | Rounded |
| 3 | H × .20 | Spiked |
| 2 | H × .15 | Rounded |
| 1 | H × .10 | Spiked |

The following table illustrates the algorithm for calculating how far the protrusions jut out from sphere's surface. This distance is best represented by the circumference of the spherical shape that the peaks of the protrusions form compared to the circumference (C) of the sphere itself. Volume levels are calculated based on known standard of decibels from sound pressure level, voltage and/or wattage.

TABLE 2

| Volume 20 = loudest | Circumference (Sphere size = C) |
| --- | --- |
| 20 | C × 1.20 |
| 19 | C × 1.19 |
| 18 | C × 1.18 |
| 17 | C × 1.17 |
| 16 | C × 1.16 |
| 15 | C × 1.15 |
| 14 | C × 1.14 |
| 13 | C × 1.13 |
| 12 | C × 1.12 |
| 11 | C × 1.11 |
| 10 | C × 1.10 |
| 9 | C × 1.09 |
| 8 | C × 1.08 |
| 7 | C × 1.07 |
| 6 | C × 1.06 |
| 5 | C × 1.05 |
| 4 | C × 1.04 |
| 3 | C × 1.03 |
| 2 | C × 1.02 |
| 1 | C × 1.01 |

Figure 17:
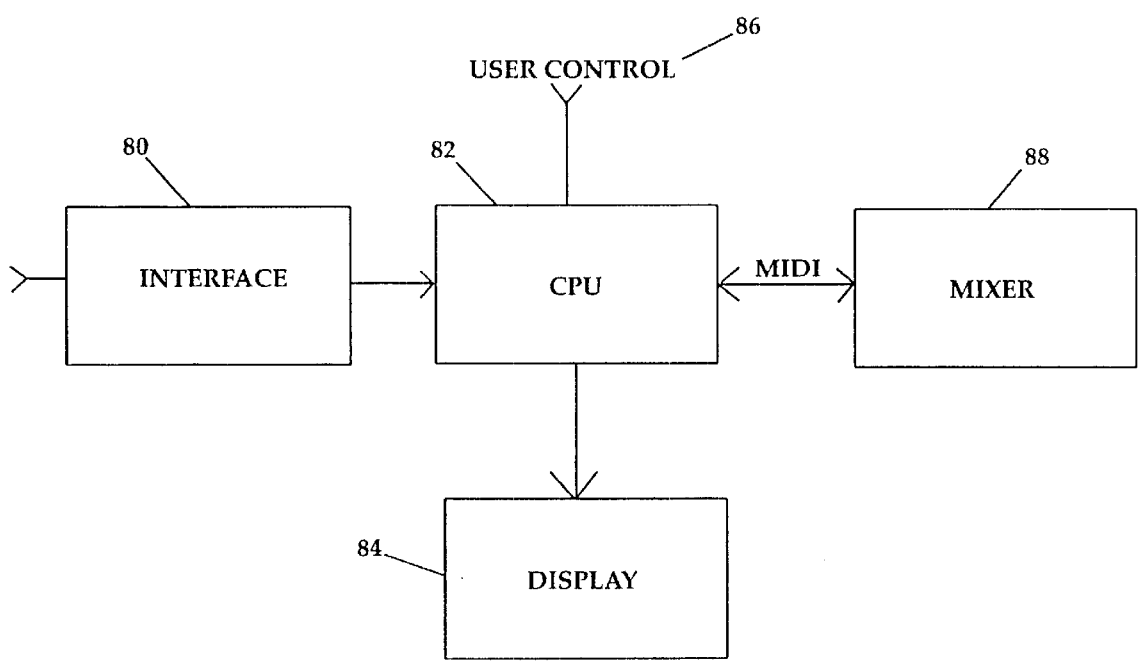
FIG. 17 is a block diagram of an alternative embodiment of an audio mixing system constructed in accordance with the present invention.

Referring now to FIG. 17, an alternative embodiment of the invention is illustrated. In this embodiment, audio source signals are not intercepted from the mixer inputs, but are coupled directly into an interface 80 which is then coupled to a CPU 82. The interface will typically include an A/D converter and any other necessary circuitry to allow direct digitization of the source signals for the CPU 82. The CPU 82 then creates visual images and displays them on video display monitor 84 in the manner already described. Adjustments to the visual images are made via a user control 86. If desired, MIDI information may be sent to an automated mixer board 88.

While the present invention has been described with reference to preferred embodiments, the description should not be considered limiting, but instead, the scope of the invention is defined by the claims.

What is claimed is:

1. A system for mixing a plurality of audio signals each of which having a plurality of audio characteristics associated therewith, the system comprising:

an audio mixer having a plurality of channels each of which for receiving one of a plurality of audio signals, and for varying audio characteristics of the received audio signal, and for outputting the varied audio signal; and a microcomputer system including:

a signal processing unit for transforming each audio signal into an audio signal visual image for display on a video display monitor, each of the audio signal visual images has visual characteristics that correspond to the audio characteristics of the corresponding audio signal, and the signal processing unit also for performing frequency analysis on each of the audio signals to detect even and odd harmonic components thereof, and for placing a first type of texturing image on the corresponding audio signal visual images for detected even harmonic components and a second type of texturing image on corresponding audio signal visual images for detected odd harmonic components.

2. The system of claim 1, wherein the vertical positions of the first and second types of texturing images on the audio signal visual images are dictated as a function of the frequency values of the corresponding detected harmonic components.

3. The system of claim 1, wherein the first and second types of texturing images are rounded and pointed protrusions respectively, and the number and height of the rounded and pointed protrusions on the audio signal visual images are dictated by the amplitudes of the corresponding detected harmonic components.

4. The system of claim 1, further comprising:

a user control for allowing a user to adjust the displayed audio signal visual images, wherein the audio mixer varies the audio characteristics of the audio signals in response to corresponding user adjustments to the displayed audio signal visual images.

5. The system of claim 4, further comprising:

an audio effects processing unit associated with each of the channels for adding audio effects to the audio signals;

the signal processing unit also for generating audio effect images for display on the video display monitor, the audio effect images have visual characteristics that correspond to audio effects added to the audio signals by the audio effects processing unit; and the user control also for allowing a user to adjust the displayed audio effect images, wherein the audio effects processing unit changes audio effects added to the audio signals in response to corresponding user adjustments to the displayed audio effect images.

6. A system for mixing a plurality of audio signals each of which having a plurality of audio characteristics associated therewith, the system comprising:

an audio mixer having a plurality of channels each of which for receiving one of a plurality of audio signals, and for varying audio characteristics of the received audio signal, and for outputting the varied audio signal; and a microcomputer system including a signal processing unit for transforming a selected audio signal into an audio signal visual image for display on a video display monitor, the audio signal visual image is segmented into portions that correspond to preselected frequency ranges, wherein the frequency components of the selected audio signal are dynamically correlated with, and visually displayed with dynamic visual characteristics in, corresponding segmented portions of the audio signal visual image.

7. The system of claim 6, wherein the audio signal visual image has a trapezoidal shape.

8. The system of claim 6, wherein each of the segmented portions has a color intensity that varies with the amplitude of the audio signal component in the corresponding frequency range.

9. An article of manufacture for use with a computer system, an audio mixer having a plurality of channels each of which for receiving one of a plurality of audio signals and for varying audio characteristics of the received audio signal and for outputting the varied audio signal an audio effects processing unit associated with each of the channels for adding audio effects to the audio signals and a plurality of speakers that broadcast the audio signals outputed by the audio mixer, the article of manufacture comprising:

a computer usable medium having computer readable program code means embodied therein for creating visual images of audio signals and audio effects the computer readable program code means in said article of manufacture comprising:

computer readable program code means for causing the computer to transform each audio signal into an audio signal visual image and to display the audio signal visual images on a video display monitor, each of the audio signal visual images has visual characteristics that correspond to the audio characteristics of the corresponding audio signal; and computer readable program code means for causing the computer to generate audio effect images and to display the audio effect images on the video display monitor, the audio effect images have visual characteristics that correspond to audio effects added to the audio signals by an audio effects processing unit, wherein the computer readable program code means is configured for causing the computer to perform frequency analysis on each of the audio signals to detect even and odd harmonic components thereof, and for causing the computer to place a first type of texturing image on the corresponding audio signal visual images for detected even harmonic components and a second type of texturing image on corresponding audio signal visual images for detected odd harmonic components.

10. The article of manufacture of claim 9, wherein the computer readable program code means is configured to cause the computer to place the first and second texturing images on the audio signal visual images in vertical positions that are a function of the frequency values of the corresponding detected harmonic components.

11. The article of manufacture of claim 10, wherein the computer readable program code means is configured to cause the computer to display rounded and pointed protrusions as the first and second types of texturing images respectively, and to determine the number and height of the rounded and pointed protrusions on the audio signal visual images as a function of the amplitudes of the corresponding detected harmonic components.

12. The article of manufacture of claim 10, wherein the computer readable program code means is configured to cause the computer to divide a selected audio signal visual image into segment portions that correspond to preselected frequency ranges, wherein the frequency components of the corresponding audio signal are dynamically correlated with, and visually displayed with dynamic visual characteristics in, corresponding segment portions of the audio signal visual image.

13. The article of manufacture of claim 10, wherein the computer readable program code means is configured to cause the computer to vary a color intensity for each of the segment portion as a function of the amplitude of the audio signal component in the corresponding frequency range.

* * * * *